US012662859B2

(12) United States Patent
Lu et al.

(10) Patent No.: US 12,662,859 B2
(45) Date of Patent: Jun. 23, 2026

(54) ADJUSTMENT MECHANISM FOR STORAGE BOX AND ADJUSTMENT DEVICE

(71) Applicant: Fulian Precision Electronics (Tianjin) Co., LTD., Tianjin (CN)

(72) Inventors: Hsueh-Chin Lu, New Taipei (TW); Yen-Lu Cheng, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 89 days.

(21) Appl. No.: 18/806,679

(22) Filed: Aug. 15, 2024

(65) Prior Publication Data

US 2024/0401386 A1 Dec. 5, 2024

Related U.S. Application Data

(62) Division of application No. 17/872,153, filed on Jul. 25, 2022, now Pat. No. 12,196,019.

(30) Foreign Application Priority Data

Aug. 31, 2021 (CN) ......................... 202122078580.4

(51) Int. Cl.

| | |
|---|---|
| ***E05C 19/14*** | (2006.01) |
| ***B65D 45/02*** | (2006.01) |
| ***B65D 53/02*** | (2006.01) |
| ***E05B 63/00*** | (2006.01) |
| ***E05B 63/06*** | (2006.01) |
| ***E05C 3/14*** | (2006.01) |
| ***E05D 3/02*** | (2006.01) |

(52) U.S. Cl.

CPC .............. *E05C 19/14* (2013.01); *B65D 53/02* (2013.01); *E05B 63/0056* (2013.01); *E05B 63/06* (2013.01); *E05C 3/14* (2013.01); *B65D 45/02* (2013.01); *E05D 3/022* (2013.01); *E05Y 2999/00* (2024.05)

(58) Field of Classification Search

CPC ........... E05C 19/14; E05C 3/14; B65D 53/02; B65D 45/02; E05B 63/0056; E05B 63/06; E05D 3/022; E05Y 2999/00

See application file for complete search history.

(56) References Cited

U.S. PATENT DOCUMENTS

| | | | | | |
|---|---|---|---|---|---|
| 3,468,577 | A * | 9/1969 | Mazerka | E05B 65/006 | 220/325 |
| 3,701,452 | A * | 10/1972 | Tonn | B65D 53/02 | 220/378 |
| 4,588,216 | A * | 5/1986 | Hinds | E05C 19/14 | 292/DIG. 60 |
| 4,893,022 | A * | 1/1990 | Hall | G21F 5/12 | 976/DIG. 348 |
| 5,667,261 | A * | 9/1997 | Weinerman | E05C 19/14 | 292/113 |

* cited by examiner

*Primary Examiner* — James N Smalley

(74) *Attorney, Agent, or Firm* — ScienBiziP, P.C.

(57) ABSTRACT

A mechanism for adjusting the distance and relative horizontal level between a storage box lid and the product storage box body includes a rod, a first adjustment member, and a second adjustment member. The rod is positioned on the edge of the box and is axially movable. The first and second adjustment members on the rod can be repositioned along the length direction of the rod to increase or decrease the distance between the lid and the box body to accommodate different thicknesses of seals between the two, and for achieving integrity in a horizontal level. A adjustment device is also disclosed.

4 Claims, 5 Drawing Sheets

100

ADJUSTMENT MECHANISM FOR STORAGE BOX AND ADJUSTMENT DEVICE

FIELD

The subject matter herein relates to product storage, especially relates to an adjustment mechanism for a storage box and an adjustment device.

BACKGROUND

A sealing ring is positioned between a box and a lid to seal the box and the lid. But the distance between the box and the lid cannot be adjust, and the sealing ring of different thickness cannot be set.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to make the above-mentioned objects, features, and advantages of the present application more obvious, a description of specific embodiments of the present application will be described with reference to the accompanying drawings. The present application can be implemented in many ways different from those described herein, and those skilled in the art can make similar improvements without violating the contents of the present application. Therefore, the present application is not to be considered as limiting the scope of the embodiments to those described herein.

Several definitions that apply throughout this disclosure will now be presented.

Unless otherwise defined, all technical and scientific terms used herein have the same meaning as commonly understood by one skilled in the art. The terms used in the present application herein are only for describing specific embodiments, and are not intended to limit the present application.

Figure 1:
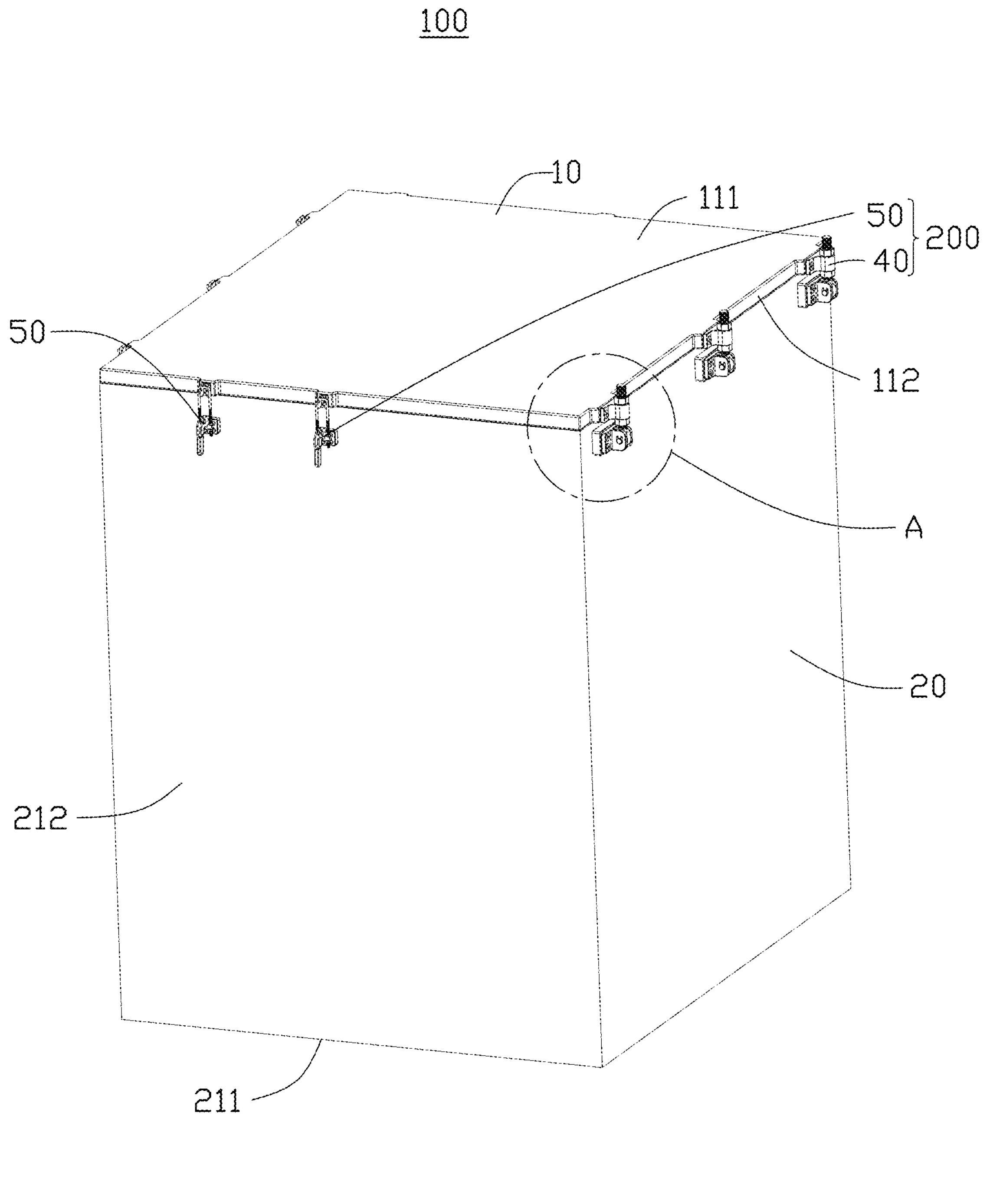
FIG. 1 is an isometric view of a product storage box in an assembled state according to an embodiment of the present disclosure.

Referring to FIG. 1, in an embodiment, a product storage box 100 includes a lid 10, a box body 20, a sealing device 30, and an adjustment mechanism 40. The lid 10 is arranged on the box body 20 and when closed can seal the box body 20. The sealing device 30 positioned between the lid 10 and the box body 20 to create a seal between the lid 10 and the box body 20. The adjustment mechanism 40 for storage box is arranged in a position where the lid 10 and the box body 20 meet. Further, the adjustment mechanism 40 can adjust the distance between of the lid 10 and the box body 20

Figure 2:
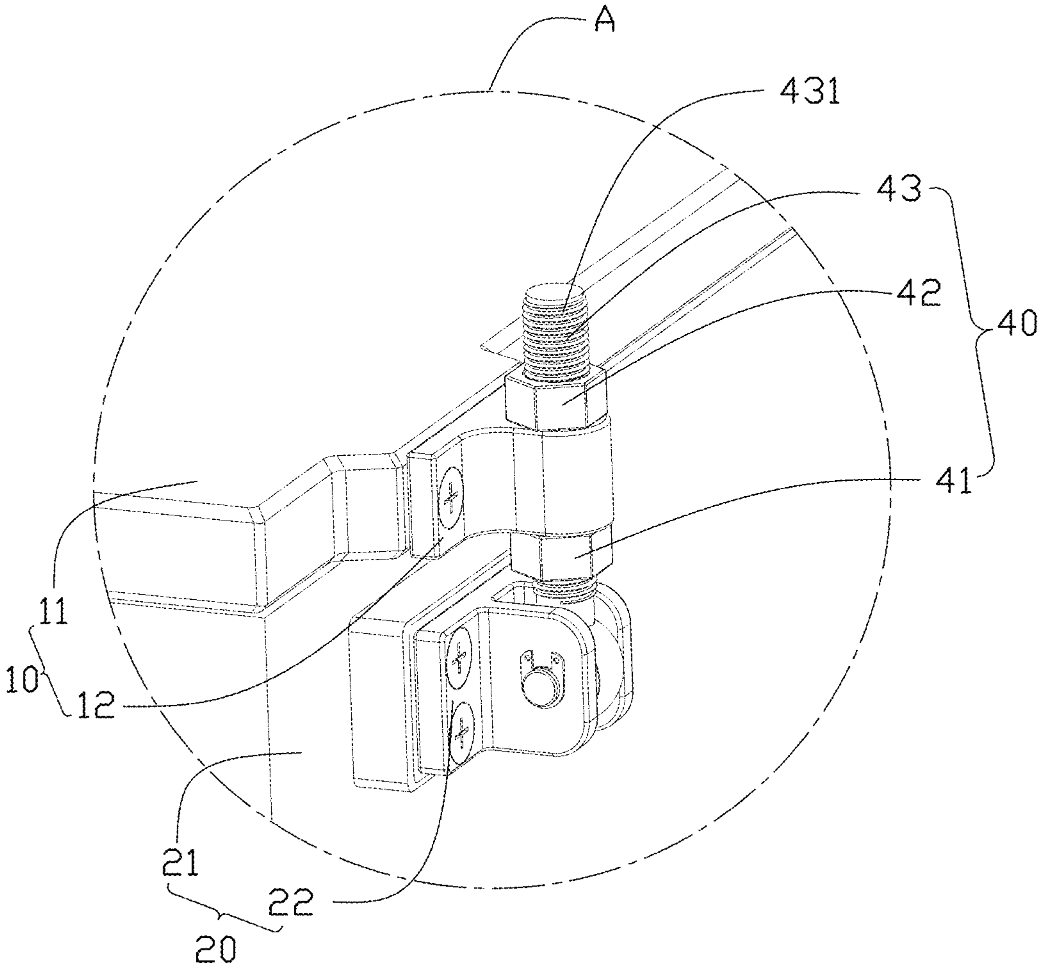
FIG. 2 is a view of circled portion A in FIG. 1.

Referring to FIGS. 1 and 2, the lid 10 includes a first body 11 and a first connector 12. The first connector 12 is arranged on the edge of the first body 11. In an embodiment, the first body 11 is connected to the first connector 12, for example, by a fastener. In an embodiment, the fastener maybe a screw.

The first body 11 includes a top plate 111 and a plurality of side walls 112, and the side walls 112 are sequentially arranged on the edge of the top plate 111. In an embodiment, the first body 11 includes four side walls 112, the four side walls 112 form a rectangle. The first connector 12 is arranged on the outer surface of the side wall 212.

In an embodiment, a number of first connectors 12 is arranged on one side wall 112. For example, three first connectors 12 are arranged on one side wall 112.

In an embodiment, the first body 11 may also include five or six side walls 112, the five side walls 112 forming a pentagon, the six side walls 212 forming a hexagon.

The first connector 12 defines a through hole 121, the through hole 121 accommodates part of the adjustment mechanism 40.

In an embodiment, the first body 11 and the first connector 12 are made of different materials. For example, the first body 11 may be made of rubber. The first connector 12 should be made of metal material. Metal material has good strength, which can improve the connective stability between the first connector 12 and the adjustment mechanism 40. The use of rubber in the first body 11 can improve the air tightness of the product storage box 100.

Referring to FIGS. 1 and 2, the box body 20 includes a second body 21 and a second connector 22. The second connector 22 is arranged on the edge of the second body 21, and the second connector 22 is close to the first connector 12. The second connector 22 and the second body 21 are connected by fasteners such as screws. The second body 21 and the second connector 22 can make use of different materials, which is beneficial to increase the diversity of the box body 20.

Figure 3:
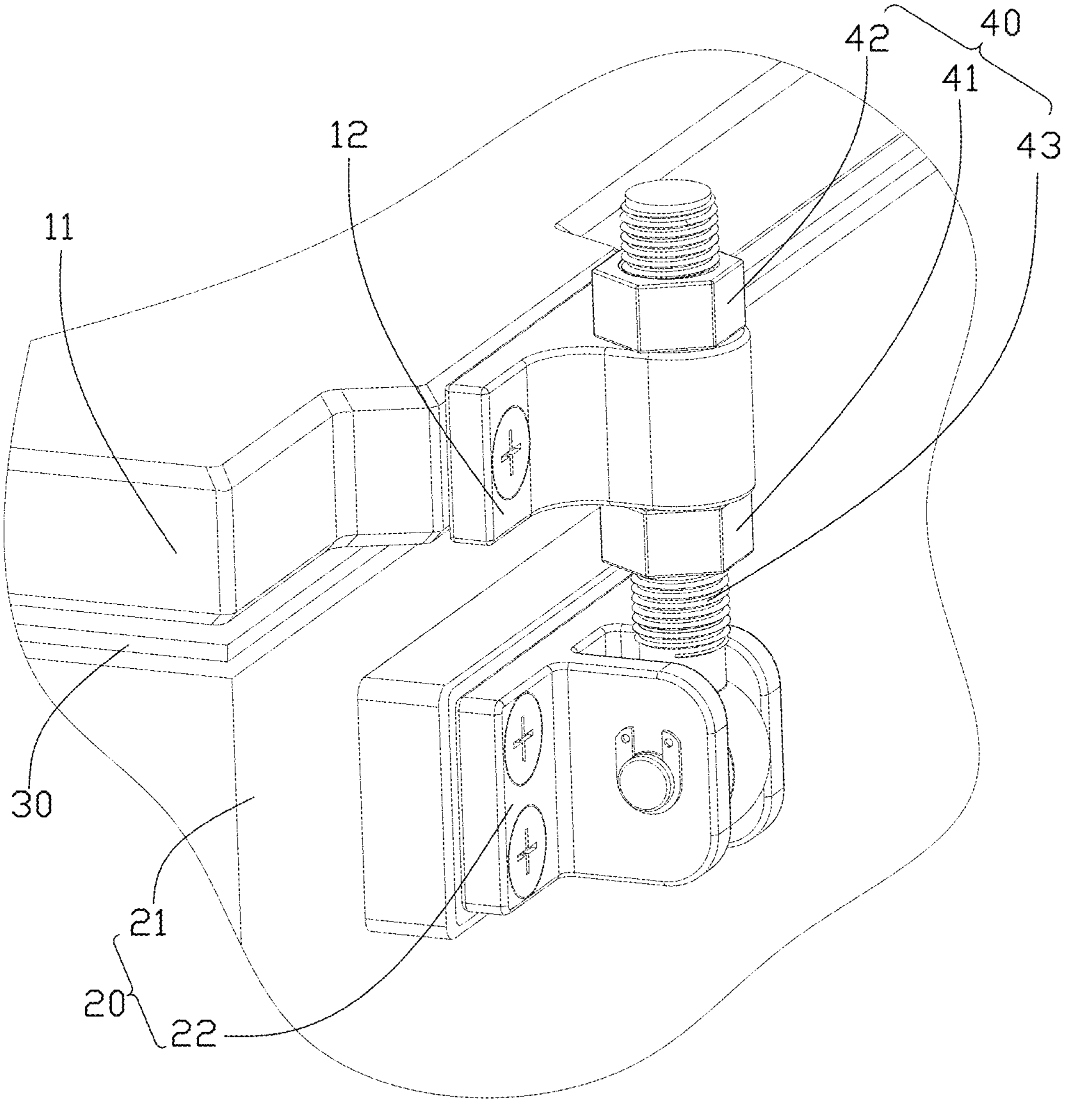
FIG. 3 is a cutaway view of the product storage box in FIG. 1.

Referring to FIG. 3, the second body 21 includes a bottom plate 211 and a plurality of side walls 212. The side walls 212 are sequentially arranged on the edge of the bottom plate 211. In an embodiment, the second body 21 includes four side walls 212, the four side walls 212 form a rectangle. The second connector 22 is arranged on the outer surface of the side wall 212. A side wall 212 of the second body 21 corresponds to side wall 212 of the first body 11.

Figure 4:
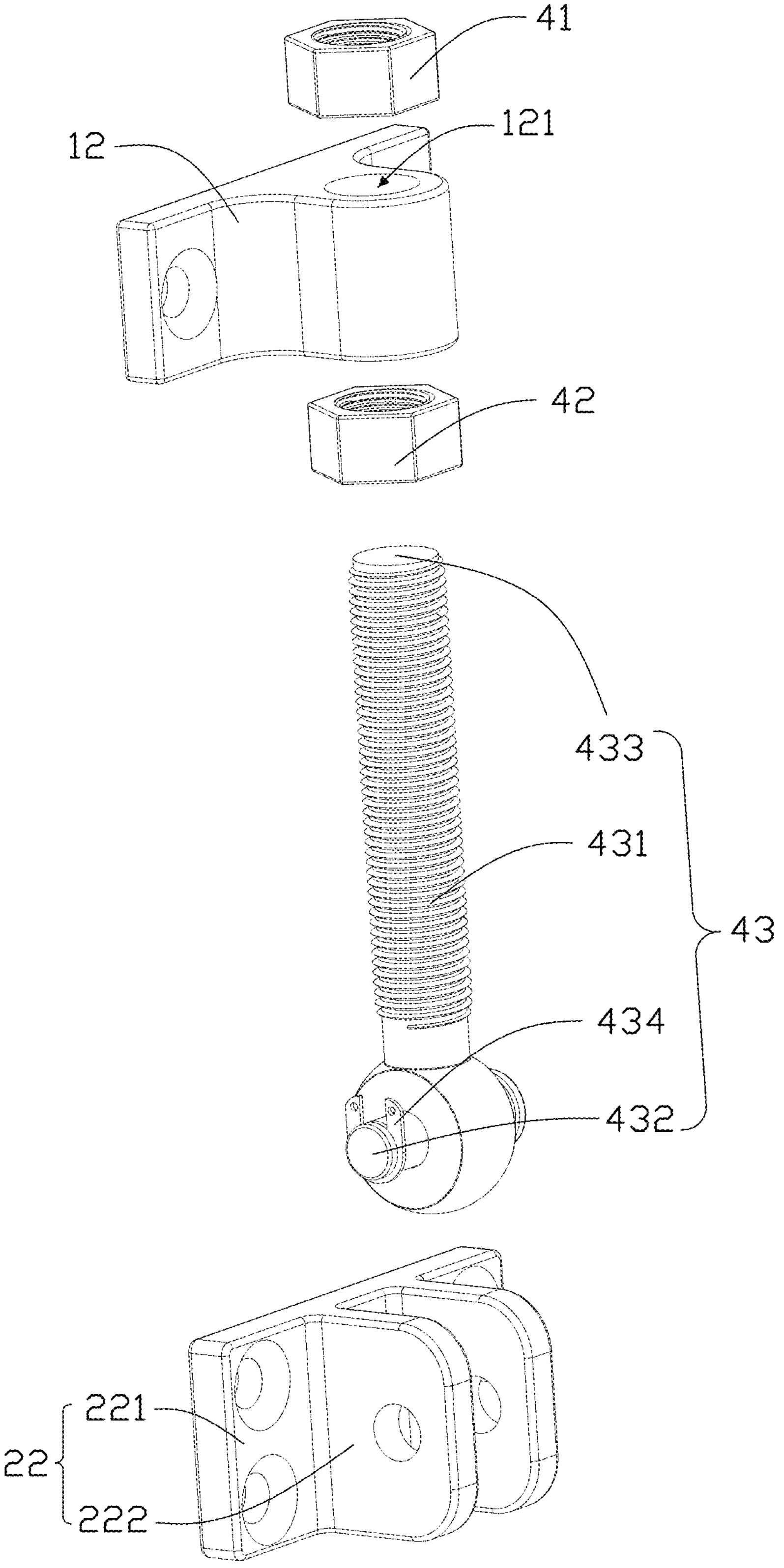
FIG. 4 is an isometric, exploded view of an adjustment mechanism shown in FIG. 2.

Referring to FIGS. 3 and 4, the second connector 22 includes a fixing component 221 and an extending component 222. The extending component 222 is positioned on one side of the fixing component 221. In an embodiment, the second connection includes two extending components 222. The two extending components 222 are arranged at intervals on the fixing component 221.

Figure 5:
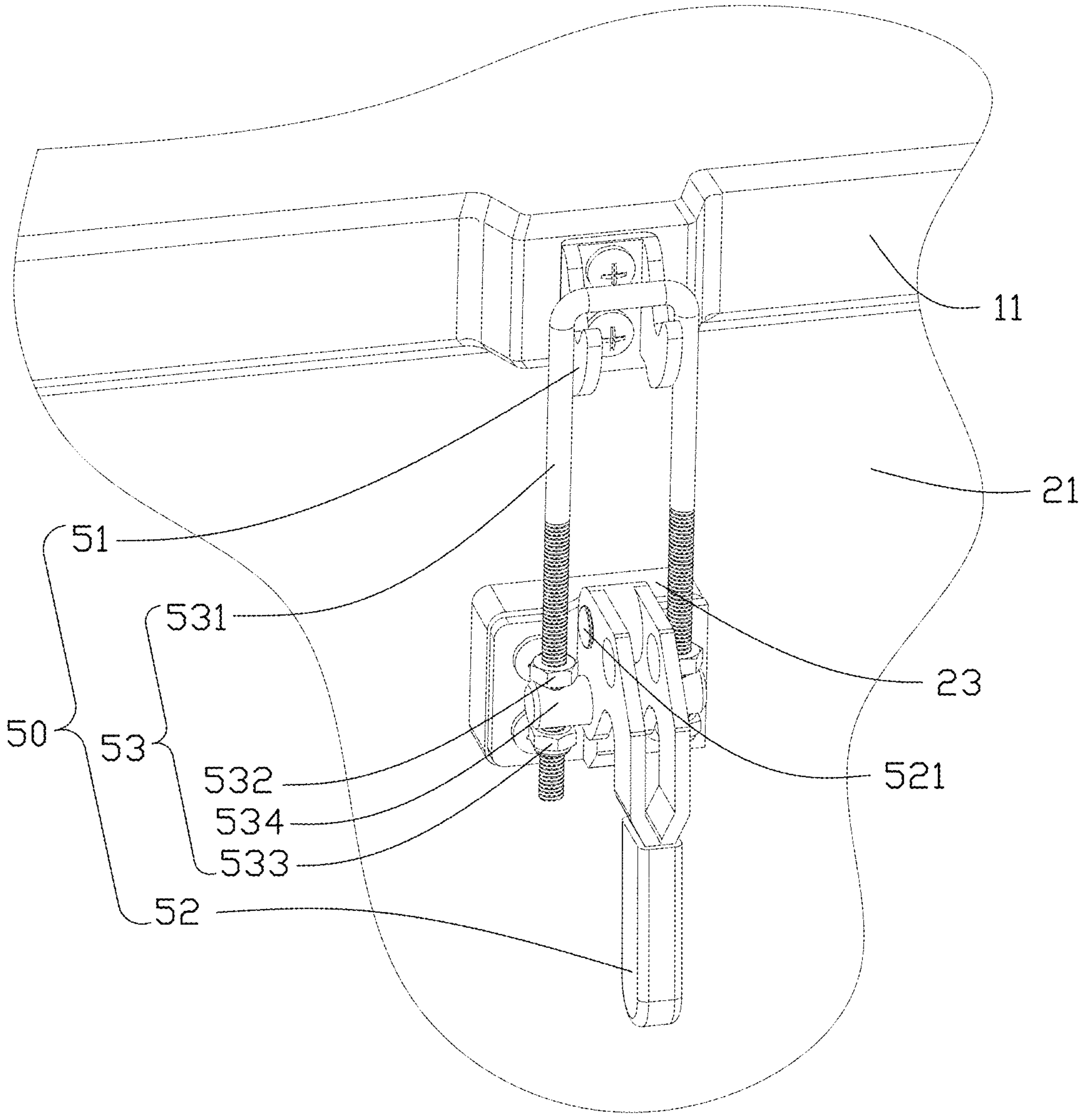
FIG. 5 is a cutaway view of the connection between a limiting mechanism, a third connector, a partial view of a first body, and a partial view of a second body in the product storage box shown in FIG. 1.

Referring to FIG. 5, the box body 20 also includes a third connector 23. The third connector 23 is positioned on one side of the fixing component 221. In an embodiment, the second connector 22 and the third connector 23 can be arranged on the same side of the second body 21. In another embodiment, the second connector 22 and the third connector 23 can be arranged on different sides of the second body 21.

Referring to FIG. 3, in an embodiment, the sealing device 30 is positioned between the side wall 112 of the first body 11 and the side wall 212 of the second body 21, to provide a seal between the first body 11 and the second body 21. The sealing device 30 is a sealing ring. The sealing ring is made of a rubber or resin. In another embodiment, the sealing device 30 can also be a sealing gasket.

Referring to FIGS. 2-4, the adjustment mechanism 40 includes a first adjustment member 41, a second adjustment member 42, and a rod 43. The first adjustment member 41 and the second adjustment member 42 are arranged on the rod 43 along a length direction of the rod 43 and can be moved along the rod 43. The rod 43 is positioned on the edge of the lid 10 and the box body 20. According to the different thicknesses of a sealing device 30, the lid 10 when in the closed position can be adjusted to be different distances from the box body 20. The adjustment is carried out by changing the positions of the first adjustment member 41 and the second adjustment member 42. Thus, sealing devices 30 of different thickness can be arranged between the lid 10 and the box body 20.

The first adjustment member 41 and the second adjustment member 42 structures are substantially the same. In an embodiment, the first adjustment member 41 and the second adjustment member 42 are both threaded nuts. The first adjustment member 41 and the second adjustment member 42 are in contact with opposite surfaces of the box, thereby the rod 43 is restricted.

The rod 43 is threaded (The rod 43 includes external threads 431). The first adjustment member 41 and the second adjustment member 42 are movable along the rod 43 because of the threads. Thereby the first adjustment member 41 and the second adjustment member 42 are connected the rod 43 by the external threads 431. The positions of the first adjustment member 41 and the second adjustment member 42 on the rod 43 can be adjusted by rotating the first adjustment member 41 and the second adjustment member 42.

In another embodiment, the first adjustment member 41 and the second adjustment member 42 are not limited to being internally-threaded nuts. The first adjustment member 41 and the second adjustment member 42 may also be other structures that can be arranged on the rod 43 and which can be adjusted for position along the length direction of the rod 43. For example, the first adjustment member 41 and the second adjustment member 42 can be plugs, the rod 43 defining a plurality of fixing holes. The fixing holes are arranged at intervals along the length direction of the rod 43. The first adjustment member 41 and the second adjustment member 42 can be passed through different positions of the rod 43 by the fixing holes. When the first adjustment member 41 and the second adjustment member 42 contact opposite surfaces of the first connector 12, the rod 43 is restricted in that position and the distance between the lid 10 and the box body 20 is cannot be adjusted until another adjustment is mad.

In an embodiment, one end of the rod 43 is rotatably connected to the box body 20. Further, one end of the rod 43 is rotatably connected to the second connector 22. A rotation axis of the rod 43 is perpendicular to the length direction of the rod 43. In another embodiment, the rod 43 can also be vertically arranged the box body 20. The lid 10 is opened or closed on the box body 20 through vertical movement.

The position of the rod 43 is not limited to being on the second connector 22. One end of the rod 43 is also rotatably connected to the first connector 12.

Referring to FIGS. 3 and 4, the rod 43 includes a shaft 433 and a first pivot 432. The first pivot 432 is disposed on the shaft 433 and protrudes outside the peripheral wall of the rod 43. The first pivot 432 is connected to the shaft 433. When the rod 43 is connected with the first connector 12 and the second connector 22, one end of the shaft 433 passes through the through hole 121, and the first pivot 432 is rotatably connected to the extending component 222. The shaft 433 is positioned between the two extending components 222 and can be slid through the lid 10. Both ends of the shaft 433 are rotatably positioned to the extending component 222, which can improve the stability of the shaft 433. The first adjustment member 41 component is positioned on one side of the first connector 12, and the second adjustment member 42 component is positioned on the opposite side of the first connector 12.

In an embodiment, the rod 43 also includes a locking member 434. Each end of the first pivot 432 is provided with the locking member 434. The locking member 434 is positioned on the first pivot 432 and is positioned on the side of the protruding portion away from the shaft 433. The locking member 434 prevents separation of the first pivot 432 and the extending component 222, which can improve the stability of the rotational connection between the shaft 433 and the second connector 22.

In another embodiment, the extending component 222 and the locking member 434 may be integral.

In an embodiment, the product storage box 100 has three adjustment mechanisms 40. The three adjustment mechanisms 40 are arranged on the one side of the box body 20. There is a gap between two adjustment mechanisms 40. By arranging the adjustment mechanism 40 at intervals, the connection stability between the box body 20 and the lid 10 can be increased.

In another embodiment, the number of adjustment mechanisms 40 is not limited to three. For example, the adjustment mechanism 40 can also be one, four or other number.

Referring to FIG. 5, the product storage box 100 also includes limiting mechanism 50. When the lid 10 covers the box body 20, the limiting mechanism 50 is used to limit the relative positions of the lid 10 and the box body 20, and to secure the lid 10 on the box body 20.

The limiting mechanism 50 includes a hook 51, a rotating member 52, and a fastener 53. The hook 51 is positioned on the first body 11. The rotating member 52 is rotatably connected to the third connector 23. The fastener 53 is rotatably connected to the rotating member 52, and a rotation axis of the fastener 53 is parallel to a rotation axis of the rotating member 52. The fastener 53 cooperates with the hook 51 to fix the lid 10 on the box body 20. In an embodiment, the hook 51 is positioned in the first body 11 with screws.

In an embodiment, when the lid 10 is closed onto the box body 20, the rotating axis of the rotating member 52 is directly above the fastener 53. When the rotating member 52 is rotated upward, the fastener 53 is moved and can be separated from the hook 51. When the rotating member 52 is rotated downward, the hook 51 can be hooked to the fastener 53, thereby fixing the lid 10.

The rotating member 52 includes a rotating shaft 521. The rotating member 52 is rotatably connected to the third connector 23 through the rotating shaft 521.

The fastener 53 includes a fastening portion 531, a first fixing member 532, a second fixing member 533, and a second pivot 534. The fastening portion 531 is U-shaped and passes through the second pivot 534. The fastening portion 531 cooperates with the hook 51 to fix the lid 10. The second pivot 534 passes through the rotating member 52 and is rotatably connected with the rotating member 52. The first fixing member 532 and the second fixing member 533 are both connected with the fastening portion 531. The first fixing member 532 and the second fixing member 533 abut against the second pivot 534 to limit the relative positions of the fastening portion 531 and the second pivot 534. By adjusting the positions of the first fixing member 532 and the second fixing member 533 on the fastening portion 531, the limiting mechanism 50 and the adjustment mechanism 40 can be matched for perfect flatness between the lid 10 and the box body 20 as well as for distance.

In an embodiment, the first fixing member 532 and the second fixing member 533 are threaded nuts.

The product storage box 100 includes a plurality of the limiting mechanisms 50. The limiting mechanisms 50 are arranged on the box body 20. Some limiting mechanisms 50 are arranged on the side adjacent to the adjustment mechanism 40, and some limiting mechanisms 50 are arranged on the side which is opposite to the adjustment mechanism 40.

In another embodiment, the method of the adjustment mechanism 40 and the limiting mechanism 50 are not limited to symmetrical or other dispositions. For example, the box body 20 is a quadrilateral. Some adjustment mechanisms 40 can be located on the same side of the box body 20, and some limiting mechanisms 50 can be located on the other three sides. Alternatively, part of the adjustment mechanism 40 and part of the limiting mechanism 50 can be located on one side of the box body 20. Alternatively, each side of the box body 20 can be equipped with adjustment mechanism 40 and limiting mechanism 50 at the same time.

By adjusting the adjustment mechanism 40 and the limiting mechanism 50, the rod 43 and the fastener 53 can be moved relative to the box body 20 or the lid 10. The adjustment mechanism 40 and the limiting mechanism 50 can be adjusted for need, so that the box body 20 and the lid 10 can utilize sealing devices 30 of different thicknesses.

An embodiment of the present application provides a product storage box 100. The first connector 12 is clamped by the first adjusting member 41 and the second adjusting member 42. By adjusting the positions of the first adjusting member and the second adjusting member, the position of the first connector 12 can be adjusted, thereby adjusting the horizontal level and the distance between the lid 10 and the box body 20.

Referring to FIG. 1, in an embodiment, an adjustment device 200 is disclosed. The adjustment device 200 includes an adjustment mechanism 40 and a limiting mechanism 50. The adjustment mechanism 40 and the limiting mechanism 50 are the adjustment mechanism 40 and the limiting mechanism 50 in the above-mentioned embodiment.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. An adjustment device comprising:

an adjustment mechanism for a storage box, the adjustment mechanism comprising:

a rod positioned on an edge of the storage box and configured for being moved on the storage box;

a first adjustment member; and a second adjustment member, the first and the second adjustment members being arranged on the rod along a length direction of the rod and movable on the rod, wherein the first adjustment member and the second adjustment member are in contact with opposite surfaces of the storage box, and the rod is restricted; and a limiting mechanism for the storage box comprising:

a hook positioned on the storage box;

a rotating member rotatably connected to the storage box; and a fastener rotatably connected to the rotating member, and a rotation axis of the fastener being parallel to a rotation axis of the rotating member.

2. The adjustment device of claim 1, wherein the hook comprises a second pivot, a fastening portion, a first fixing member, and a second fixing member, the second pivot is rotatably connected with the rotating member, the fastening portion passes through the second pivot and is cooperated with the hook, the second fixing member and the first fixing member are both threadedly connected with the fastening portion, the first fixing member and the second fixing member abut against the second pivot.

3. The adjustment device of claim 1, wherein the rod comprises external threads, the first adjustment member and the second adjustment member are connected to the rod by the external threads.

4. The adjustment device of claim 1, wherein a rotation axis of the rod is perpendicular to the length direction of the rod.

* * * * *